(12) United States Patent  
Ma et al.

(10) Patent No.: US 8,116,524 B2  
(45) Date of Patent: Feb. 14, 2012

(54) METHOD OF OBJECT DETECTION

(75) Inventors: Guanglin Ma, Wuppertal (DE); Ing Su-Birm Park, Aldenhoven (DE); Alexander Ioffe, Bonn (DE)

(73) Assignee: Delphi Technologies, Inc., Troy, MI (US)

( * ) Notice: Subject to any disclaimer, the term of this patent is extended or adjusted under 35 U.S.C. 154(b) by 764 days.

(21) Appl. No.: 12/231,299

(22) Filed: Aug. 29, 2008

(65) Prior Publication Data

US 2009/0129632 A1  May 21, 2009

(30) Foreign Application Priority Data

Sep. 13, 2007 (EP) .................................. 07017987

(51) Int. Cl.
*G06K 9/00* (2006.01)
*H04N 5/225* (2006.01)
*G08G 1/01* (2006.01)

(52) U.S. Cl. ..................... 382/103; 348/169; 340/933

(58) Field of Classification Search .............. 382/103, 382/104, 107, 149, 236; 348/154, 155, 169, 348/170, 171, 172, 352; 340/910, 917, 918, 340/933; 701/34, 109
See application file for complete search history.

(56) References Cited

U.S. PATENT DOCUMENTS

| | | | | |
|---|---|---|---|---|
| 5,517,419 A | * | 5/1996 | Lanckton et al. | 701/216 |
| 5,812,692 A | * | 9/1998 | Rosenlof et al. | 382/133 |
| 6,587,573 B1 | * | 7/2003 | Stam et al. | 382/104 |
| 6,631,316 B2 | * | 10/2003 | Stam et al. | 701/36 |
| 7,046,822 B1 | * | 5/2006 | Knoeppel et al. | 382/103 |

OTHER PUBLICATIONS

Ma, Guanglin; Park, Su-Birm; Ioffe, Alexander; Muller-Schneiders, Stefan; Kummert, Anton: "A Real Time Object Detection Approach Applied to Reliable Pedestrian Detection" Intelligent Vehicles Symposium, 2007 IEEE, Jun. 13, 2007 755-760.

Bertozzi et al: "Pedestrian Detection by Means of Far-Infrared Stereo Vision" Computer Vision and Image Understanding, Academic Press, San Diego, VA, US Bd. 106, Nr. 2-3; 194-204.

Zehang Sun et al: "A Real-Time Precrash Vehicle Detection System" Applications of Computer Vision, 2002 (WACV 2002) Proceedings. SITH IEEE Workshop on Dec. 3-4, 2002 Piscataway, NJ, USA, IEEE, December 3, 2002; 171-176.

Yajun Fang et al: "Comparison Between Infrared-Image Based and Visible Image Based Approaches for Pedestrian Detection" Intelligent Vehicles Symposium, 2003. Proceedings. IEEE Jun. 9-11, 2003; 505-510.

* cited by examiner

*Primary Examiner* — Abolfazl Tabatabai
(74) *Attorney, Agent, or Firm* — Lawrence D. Hazelton

(57) ABSTRACT

A method is set forth for the detection of an object, in particular in a road, in particular of a pedestrian, in the surroundings in the range of view of an optical sensor attached to a carrier such as in particular a vehicle, wherein, from the range of view of the optical sensor, a relevant spatial region disposed below the horizon is determined, a gray scale image is produced by means of the optical sensor which includes a relevant image region corresponding to the relevant spatial region, and a search for a possible object is only made in this relevant image region corresponding to the relevant spatial region disposed below the horizon for the detection of the object.

9 Claims, 4 Drawing Sheets

METHOD OF OBJECT DETECTION

TECHNICAL FIELD

The invention relates to a method for the detection of an object, in particular an object in a road, in particular a pedestrian, in the surroundings in the range of view of an optical sensor attached to a carrier such as in particular a vehicle.

BACKGROUND OF THE INVENTION

In obstacle detection systems based on online vision, an essential preprocessing step for the obstacle classification consists of a detection of image regions which is efficient with respect to the computing time, with it being assumed of such image regions that they contain the obstacles of interest, whereby the computing effort is reduced overall and more robust real time classification software is made possible.

The obstacle detection with reference to a single gray scale image is of advantage to the extent that it enables an efficient calculation and is independent of the inherent movement of the vehicle having the detection system, of changes in light intensity, etc.

Various applications exist in which one-dimensional or two-dimensional profiles are produced for the obstacle detection. These applications are either monitoring systems or obstacle detection systems with infrared sensors in which the contour of the obstacles can be unambiguously detected either by a background subtraction or by the sensor. The one-dimensional or two-dimensional profiles of these applications can unambiguously describe the obstacles detected. In contrast, a direct one-dimensional or two-dimensional profile does not work in a gray scale image due to the complexity of the image scene and the variety of the pixel intensities.

SUMMARY OF THE INVENTION

It is the underlying object of the invention to set forth a possibility to reduce the computing effort for the detection of an object, in particular in a road, in particular of a pedestrian, and/or to increase the robustness of such a detection.

This object is satisfied in accordance with the invention by a method for the detection of an object, in particular in a road, in particular of a pedestrian, in the surroundings in the range of view of an optical sensor attached to a carrier such as in particular a vehicle, wherein, from the range of view of the optical sensor, a relevant spatial region disposed below the horizon is determined, a gray scale image is produced by means of the optical sensor which includes a relevant image region corresponding to the relevant spatial region, and a search for a possible object is only made in this relevant image region corresponding to the relevant spatial region disposed below the horizon for the detection of the object.

In this connection, an in particular narrow, horizontal strip below the horizon is preferably selected as the relevant image region of the gray scale image.

On the search for a possible object within the relevant image region of the gray scale image, a search is advantageously made for at least one feature representative of a vertical orientation.

For this purpose, the gray values are preferably added or integrated for each column of pixels within the relevant image region of the gray scale image.

Then, the upper envelope of the gray value signal integrated column-wise is expediently produced and the difference between the envelope and the gray value signal integrated column-wise is preferably formed by means of a low pass filter in order thereby to obtain a one-dimensional profile representing the vertical orientation in the relevant image region of the gray scale image.

It is in particular of advantage in this connection for the values of the one-dimensional profile to be compared with a threshold value and for a respective value of the one-dimensional profile, which is disposed above the threshold value, to be used as an indication for an initial object detection.

An in particular binary vertical edge can then be extracted for each initial object detection in the relevant image region of the gray scale image. The extracted vertical edge is then preferably subjected to a morphological operation to obtain a presettable pronounced vertical edge.

Advantageously, the lowest end point of each vertical edge obtained by a respective morphological operation is located and this lowest end point is defined as the nadir of the detected possible object.

Starting from the nadir, a bounding box adapted to the size of the object can then be defined for a subsequent object classification.

A subject of the invention is furthermore a computer program with programming code means to carry out the method described above when the program is carried out on a computer or on a corresponding computing unit.

A computer program product is also a subject of the invention having programming code means stored on a computer readable data carrier to carry out the method described above when the computer program is carried out on a computer or on a corresponding computing unit.

In this connection, a computer is understood as any desired data processing device with which the method can be carried out. In this connection, such a data processing device can in particular include digital signal processors and/or microprocessors with which the method can be carried out in full or in parts.

Finally, a device for the detection of an object, in particular in a road, in particular of a pedestrian, in the surroundings in the range of view of an optical sensor attached to a carrier such as in particular a vehicle, having a data processing device which is designed for the carrying out of the method described above is also a subject of the invention.

Unlike with the initially named known extraction algorithm based on a one-dimensional or two-dimensional profile, a one-dimensional profile can be produced directly from the relevant image region of the gray scale image without any preprocessing of the image on the basis of the solution in accordance with the invention. A decision on whether an obstacle is present in a scene or not can be made by an evaluation of the one-dimensional profile produced.

For the improvement of the computing efficiency, the relevant region used for the detection (region of interest) can be fixed in a small horizontal strip below the horizon. The height of the strip can amount, for example, to 30 pixels in a mono-camera of the VGA type (640×480). The strip can, for example, be arranged 10 pixels below the horizon. Since the strip is, for example, fixed 10 pixels below the horizon, the relevant detection region is only focused on the ground area and a search for objects is only made above this ground area. An advantage of the solution in accordance with the invention is in particular that, in view of the defined relevant search region, an observation of the complex background in the horizontal region does not take place and only objects or pedestrians in the simple background close to the ground area are observed.

A search is made within the defined object detection strip or pedestrian detection strip for a feature of the object or pedestrian representative of a pronounced vertical alignment to detect object candidates or pedestrian candidates. Unlike with the previously customary detection algorithms, the original gray scale image can be accessed directly. The gray values of each column in the object detection strip or pedestrian detection strip can be added or integrated.

The upper envelope of the signal integrated column-wise can then be produced by a low pass filter, for example, whereupon an absolute subtraction can be carried out between the envelope and the signal integrated column-wise.

The subtraction results in the one-dimensional profile of the object detection strip or pedestrian detection strip which represents the vertical of the gray image in the detection strip. The values of the one-dimensional profile can then be compared with a threshold to select each signal in the one-dimensional profile disposed above the threshold as the initial detection.

In particular a binary vertical edge in the defined detection strip can then be extracted from each initial detection. The in particular binary vertical edge can then be subjected to a morphological operation to obtain only pronounced or large vertical edges.

The lowest end point of the result of the morphological operation can then be located in each relevant region and the located end point can be defined as the nadir of the detected object candidate or pedestrian candidate.

Starting from the located nadir, a bounding box adapted to the size of the object or of the pedestrian can then be produced which can be input into the classifier for the further processing.

Unlike conventional processes for the detection of pedestrian candidates, the solution in accordance with the invention thus enables a direct processing of a gray scale image in a small region, with the processing moreover being substantially faster.

BRIEF DESCRIPTION OF THE DRAWINGS

The invention will be explained in more detail in the following with reference to embodiments and to the drawing; there are shown in this.

DESCRIPTION OF THE PREFERRED EMBODIMENT

Figure 1:
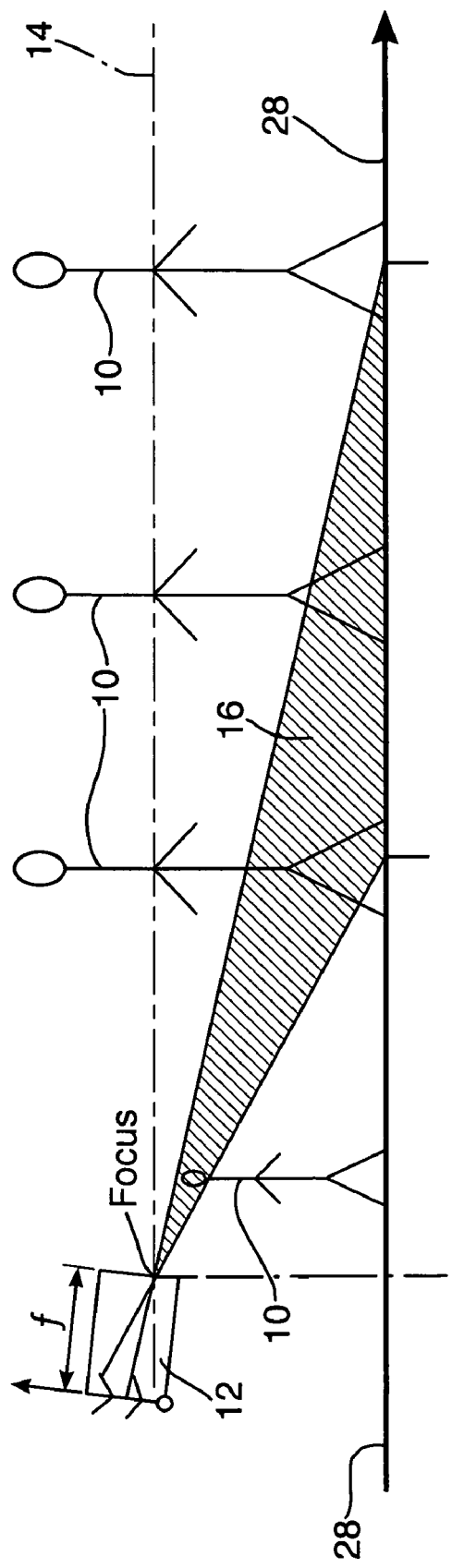
FIG. 1 is a schematic representation of a possible relevant spatial region to which the object detection or pedestrian detection is limited.

In FIGS. 1 to 6, a purely exemplary embodiment of a method for the detection of an object 10, in particular in a road, in particular of a pedestrian, in the surroundings in the range of view of an optical sensor 12 attached to a carrier such as in particular a vehicle is reproduced.

In this connection, a relevant spatial region 16 disposed below the horizon 14 from the range of view of the optical sensor 12 is determined (cf. in particular FIG. 1). A gray scale image 18 is produced by means of the optical sensor 12 (cf. in particular FIGS. 1 and 4 to 6) and includes a relative image region 20 corresponding to the relevant spatial region 16 (cf. in particular FIG. 2). A search is then made for a possible object 10 only in this relevant image region 20 corresponding to the relevant spatial region 16 disposed below the horizon 14 for the detection of the object 10. As already mentioned, the objects 10 in question can in particular be pedestrians.

Figure 2:
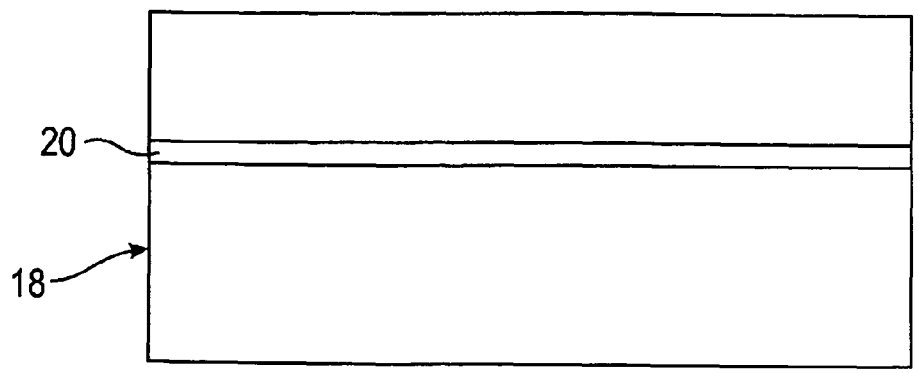
FIG. 2 is the relevant image region of the gray scale image corresponding to the relevant spatial region in accordance with FIG. 1.

FIG. 1 shows, in a schematic representation, a possible relevant spatial region 16 to which the object detection or pedestrian detection is limited. In FIG. 2, the relevant image region 20 of the gray scale image 18 corresponding to the relevant spatial region 16 in accordance with FIG. 1 is shown. As can in particular be recognized with reference to this FIG. 2, the relevant image region 20 can in particular be a narrow horizontal strip below the horizon 14 (cf. also FIG. 1).

On the search for a possible object 10 within the relevant image region 20 of the gray scale image 18, a search is made for at least one feature representative of a vertical orientation.

In this connection, the gray values can, for example, be added or integrated for every column of pixels within the relevant image region 20 of the gray scale image 18. The upper envelope 22 of the gray value signal 24 integrated column-wise can then be produced and the difference 26 between the envelope 22 and the gray value signal 24 integrated column-wise can be formed, for example by means of a low pass filter, in order thereby to obtain a one-dimensional profile representing the vertical orientation in the relevant image region 20 of the gray scale image 18.

Figure 3:
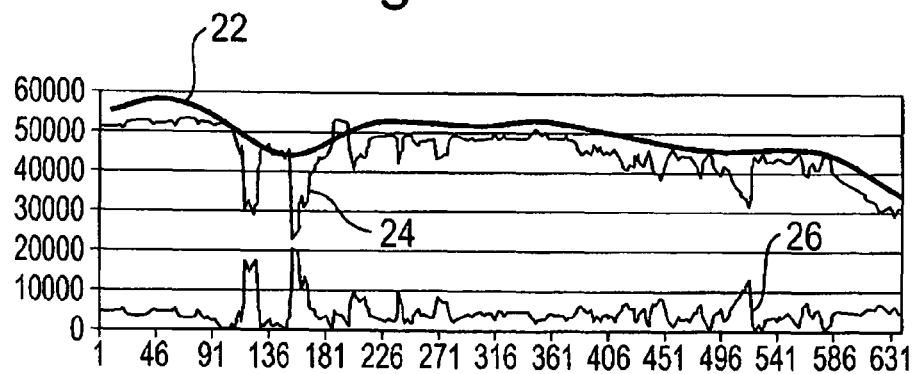
FIG. 3 is a diagram in which an exemplary curve of the gray value signal which has been integrated column-wise and whose upper envelope and the difference, which forms the one-dimensional profile, between the upper envelope and the gray value signal integrated column-wise are reproduced.

FIG. 3 shows a diagram in which an exemplary curve of the gray value signal 24 which has been integrated column-wise, its upper envelope 22 and the difference 26, which forms the one-dimensional profile, between the upper envelope 22 and the gray value signal 24 integrated column-wise are reproduced.

The detection region of interest can therefore be a narrow horizontal strip below the horizon. The height of the strip can amount, for example, to 30 pixels in a monocamera of the type VGA (640×480), for example, forming the optical sensor 12. The strip can, for example, be arranged 10 pixels below the horizon. Since the strip is, for example, in particular positioned 10 pixels below the horizon, the relevant detection region or spatial region 16 is only directed to the ground area 28 or the road (cf. in particular FIG. 1). An observation of the complex background in the horizon region is avoided with such a search region of interest. Only objects 10 or pedestrians have to be observed against a simple background determined by the ground area 28.

As in particular results from FIGS. 2 and 3, a search is made for at least one feature representative of a pronounced vertical orientation within the defined object detection strip or pedestrian detection strip, that is within the strip-like image region 20, to detect a possible object 10 or object candidate. Use is directly made of the original gray value image in this connection. The gray values of each column in the strip-like relevant image region 20 are, for example, added or integrated in accordance with the following equation:

$$p_u = \sum_v I_{uv},$$

where u is the horizontal coordinate of the relevant image region 20 and v is the vertical coordinate of the relevant image region 20.

Since the image is preferably produced in a binary manner, the pixel intensity I has either the value 0 or the value 255.

A one-dimensional profile which is representative of a vertical orientation is obtained by an absolute subtraction between the original gray value signal 24 integrated column-wise and its upper envelope 22, that is with the relevant difference 26.

Figure 4:
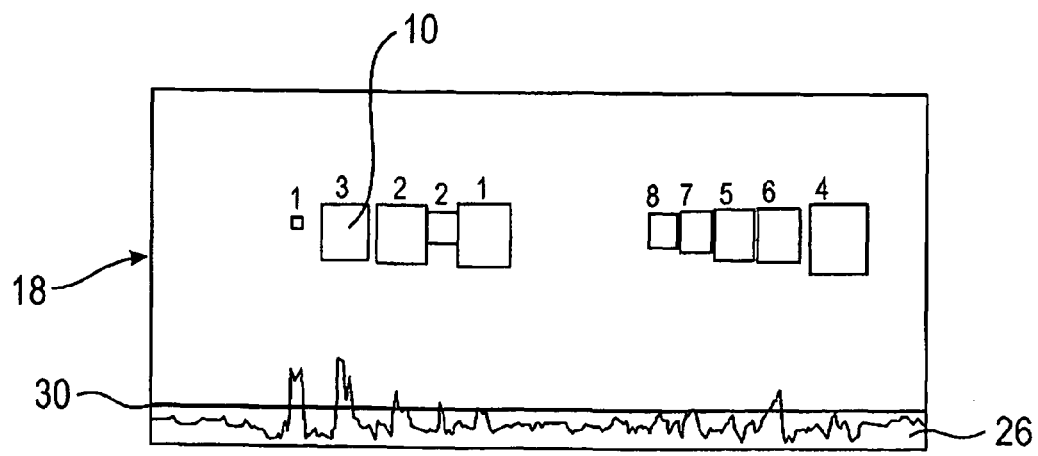
FIG. 4 is the one-dimensional profile in accordance with FIG. 4 with associated threshold value and possible objects or pedestrians detected with reference to the initial object detection.

As can in particular be recognized with reference to FIG. 4, the values of the one-dimensional profile, that is the difference 26, can be compared with a threshold value 30. A respective value of the one-dimensional profile, which is disposed above the threshold value 30, can then be used as an indication for an initial object detection. This means that a respective object 10 can then be considered as initially detected when the respective value of the one-dimensional profile is disposed above the threshold value 30. Initially detected objects 10 are each framed by a rectangle in FIG. 4.

The detection result of the previously mentioned one-dimensional profile only represents the horizontal position of the object candidate or of the pedestrian candidate. There is therefore not yet any information on the size or depth of the detected object present.

To now obtain the correct size of the detected object candidate, it is possible, for example, to proceed as follows:

a small relevant region beneath the detected point from each detected point on the one-dimensional profile is defined and a binary vertical edge is extracted within this defined relevant region. The image of the binary vertical edge is subjected to a vertical morphological operation to obtain only still large vertically oriented edges.

In the relevant image region 20 of the gray scale image 18, an in particular binary vertical edge can therefore be extracted for each initial object detection which is then subjected to a morphological operation to obtain a presettable pronounced vertical edge.

Figure 5:
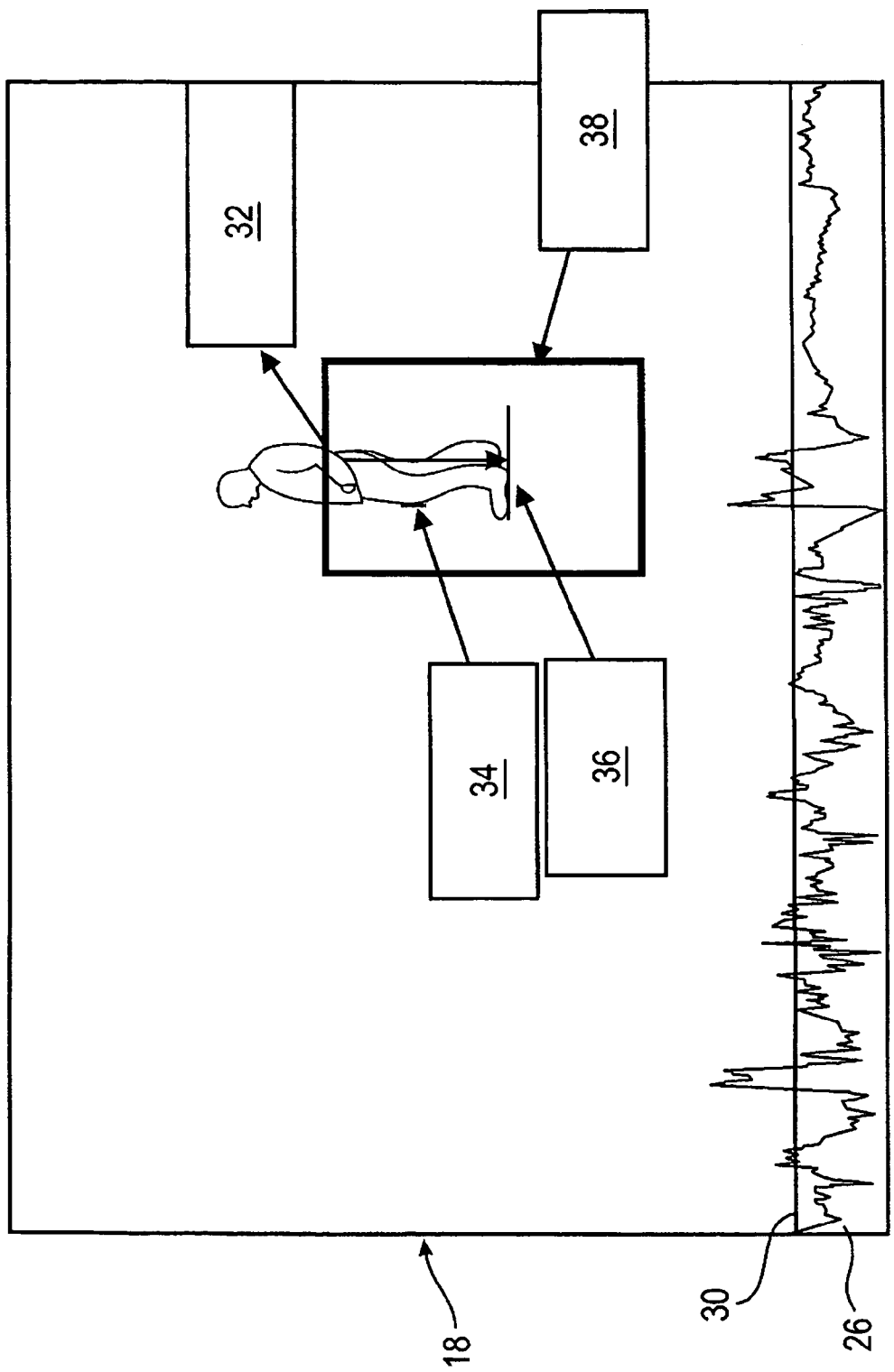
FIG. 5 is a schematic representation of the search for the nadir of a detected possible object or pedestrian.
Figure 6:
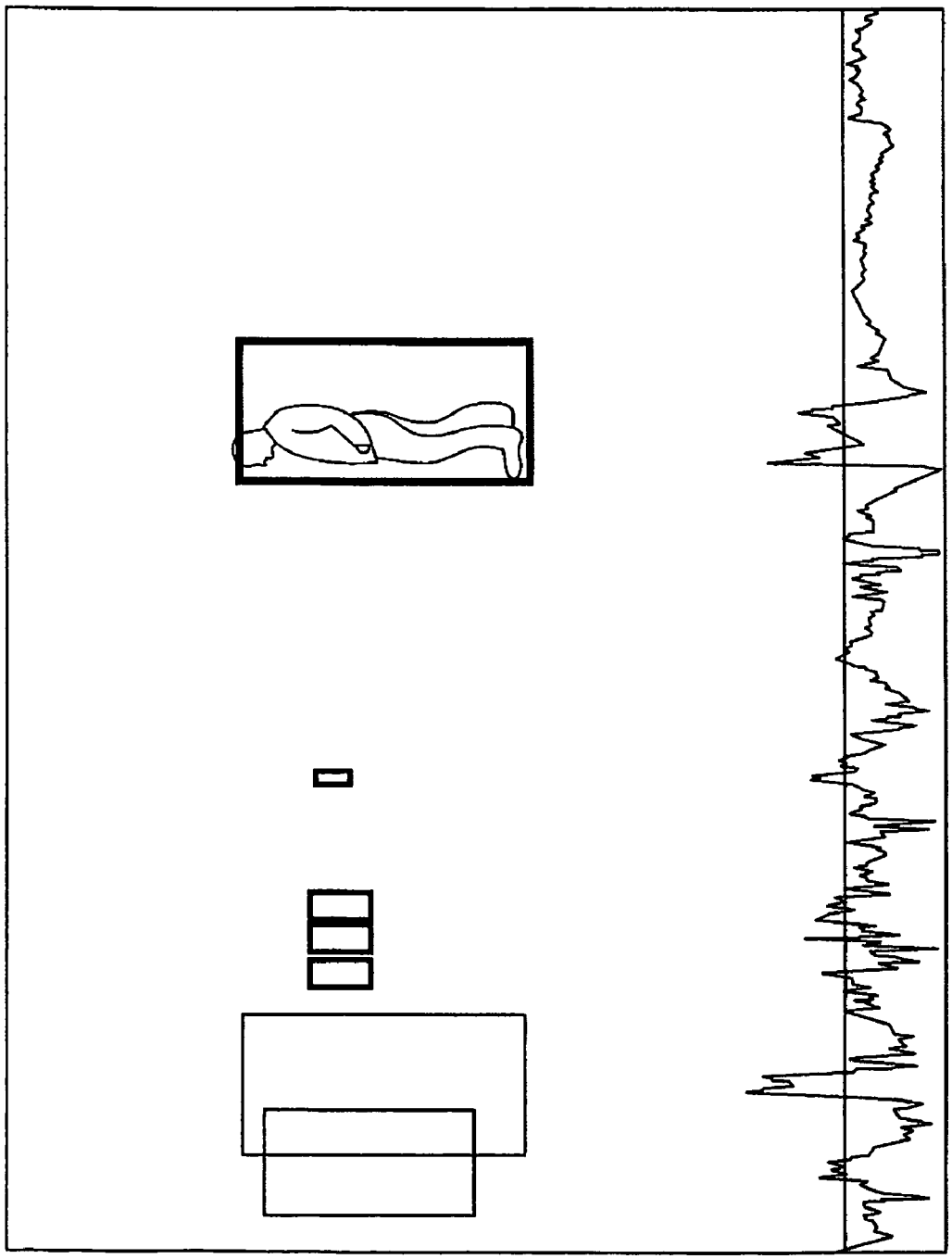
FIG. 6 is a schematic representation of the production of a bounding box adapted to the size of the object or of the pedestrian.

FIG. 5 shows a schematic representation of the search for a nadir of a detected possible object 10 or pedestrian, whereas in FIG. 6 the production of a bounding box adapted to the size of the object 10 or of the pedestrian is shown schematically.

The lowest end point of the result 34 of the morphological operation of each initially detected point 32 of the one-dimensional profile (cf. FIG. 5) can thus now be located (cf. in particular FIG. 5 again) in the relevant region disposed below it. The located end point is then defined as the nadir 36 of the detected object candidate or pedestrian candidate. Starting from the located nadir 36, a bounding box adapted to the size of the object or of the pedestrian (cf. FIG. 5) can then be produced.

The lowest end point of each vertical edge obtained by a respective morphological operation can be located, for example, and this lowest end point can be defined as the nadir 36 of the detected possible object or pedestrian. For a subsequent object classification, starting from the nadir 36, a bounding box adapted to the size of the object 10 or pedestrian can then be defined.

The invention claimed is:

1. A method for the detection of an object in the surroundings within view of an optical sensor attached to a vehicle, comprising:

determining a relevant spatial region below a horizon within view of the optical sensor;
producing a gray scale image by means of the optical sensor, said gray scale image including a relevant image region corresponding to the relevant spatial region;
adding gray scale values for every column of pixels within the relevant image region of the gray scale image;
producing an upper envelope of a gray value signal integrated column-wise;
determining a difference between the upper envelope and the gray value signal in order to obtain a one-dimensional profile representing the vertical orientation within the relevant image region of the gray scale image; and
searching the difference to detect an object, said searching being carried out only in the relevant image region corresponding to the relevant spatial region below the horizon.

2. A method in accordance with claim 1, wherein the relevant image section of the gray scale image is a narrow horizontal strip below the horizon.

3. A method in accordance with claim 1, wherein searching to detect an object includes searching for at least one feature representative of a vertical orientation.

4. A method in accordance with claim 1, wherein the gray scale values of the one-dimensional profile are compared with a threshold value, and a respective value of the one-dimensional profile disposed above the threshold value is used as an indication for an initial object detection.

5. A method in accordance with claim 4, wherein a binary vertical edge is extracted for each initial object detection within the relevant image region of the gray scale image, and the extracted vertical edge is subjected to a morphological operation obtaining a presettably pronounced vertical edge.

6. A method in accordance with claim 5, wherein a lowest end point of each pronounced vertical edge is located, and the lowest end point is defined as a nadir of a possible detected object.

7. A method in accordance with claim 6, wherein starting from the nadir of the possible detected object, a bounding box is produced that is adapted to a size of the possible detected object.

8. A media including computer-readable instructions for detection of an object in the surroundings of a moving vehicle using an optical sensor having a view, said computer-readable instructions being adapted to configure a data processing device to carry out a method comprising:

determining a relevant spatial region below a horizon within view of the optical sensor;
producing a gray scale image by means of the optical sensor, said gray scale image including a relevant image region corresponding to the relevant spatial region;
adding gray scale values for every column of pixels within the relevant image region of the gray scale image;
producing an upper envelope of a gray value signal integrated column-wise;
determining a difference between the upper envelope and the gray value signal in order to obtain a one-dimensional profile representing the vertical orientation within the relevant image region of the gray scale image; and
searching the difference to detect an object, said searching being carried out only in the relevant image region corresponding to the relevant spatial region below the horizon.

9. An apparatus for the detection of an object in the surroundings of a moving vehicle, said apparatus comprising:
an optical sensor attached to the moving vehicle; and a data processing device connected to the optical sensor and configured to carry out a method comprising:

determining a relevant spatial region below a horizon within view of the optical sensor;

producing a gray scale image by means of the optical sensor, said gray scale image including a relevant image region corresponding to the relevant spatial region;

adding gray scale values for every column of pixels within the relevant image region of the gray scale image;

producing an upper envelope of a gray value signal integrated column-wise;

determining a difference between the upper envelope and the gray value signal in order to obtain a one-dimensional profile representing the vertical orientation within the relevant image region of the gray scale image; and searching the difference to detect an object, said searching being carried out only in the relevant image region corresponding to the relevant spatial region below the horizon.

* * * * *